United States Patent [19]

Iwata

[11] 4,184,151
[45] Jan. 15, 1980

[54] CIRCUIT FOR DIGITALLY PROCESSING EXPOSURE INFORMATION

[75] Inventor: Shigehisa Iwata, Tokyo, Japan

[73] Assignee: Nippon Electric Co., Ltd., Tokyo, Japan

[21] Appl. No.: 774,172

[22] Filed: Mar. 3, 1977

[30] Foreign Application Priority Data

Mar. 5, 1976 [JP] Japan .................................. 51-24530

[51] Int. Cl.² ............................................. H03K 13/20
[52] U.S. Cl. ............................... 340/347 AD; 356/223; 354/23 D
[58] Field of Search .................... 340/347 M, 347 AD; 354/23 D, 24; 356/223

[56] References Cited

U.S. PATENT DOCUMENTS

| 3,273,142 | 9/1966 | Zukin | 340/347 AD |
| 3,631,468 | 12/1971 | Spaid | 340/347 AD |
| 3,760,407 | 9/1973 | Terry | 340/347 M |
| 3,909,137 | 9/1975 | Kisanuki | 340/347 M |
| 3,995,284 | 11/1976 | Kitaura et al. | 354/23 D |
| 4,023,159 | 5/1977 | Miyakawa | 340/347 M |
| 4,037,233 | 7/1977 | Shinoda et al. | 354/23 D |

OTHER PUBLICATIONS

Johannesen, "Electronics Letters", Sep. 1971, vol. 7, No. 12, pp. 592–593.

Primary Examiner—Charles D. Miller
Attorney, Agent, or Firm—Sughrue, Rothwell, Mion, Zinn and Macpeak

[57] ABSTRACT

A circuit system designed to realize fully digitalized automatic exposure controls is provided in which the read-in brightness information is logarithmically compressed directly into a digital quantity without the aid of any diode element that exhibits a logarithmic characteristic. This enables full utilization of the merits of digitalization while affording further advantages including increased stability against temperature and voltage variations.

9 Claims, 4 Drawing Figures

CIRCUIT FOR DIGITALLY PROCESSING EXPOSURE INFORMATION

BACKGROUND OF THE INVENTION

This invention relates to circuits for digitally processing exposure control information for cameras and more particularly to those for digitally processing scene brightness or luminance level information.

As is generally known, there exists among the exposure control informations including the shutter speed or the exposure time T, the aperture A, the film sensitivity S and scene brightness B a relationship expressed by the following equation:

$$B = K \cdot A/(T \cdot S) \tag{1}$$

where K is a constant. In obtaining an optimum exposure by computation based upon the above equation, the respective informations given are usually logarithmically compressed so that they may conveniently be dealt with as exponential informations, particularly because the scene brightness B varies over very wide range with the ratio of its maximum to its minimum reaching $10^6$ or greater. Logarithmic compression of the exposure informations enables computation to be effected simply by addition and subtraction, and makes it possible to employ electric circuitry of very simple structure for such computation. Obviously, the exposure control information obtained in this manner is finally logarithmically expanded so as to be utilized as an actual control information.

Logarithmic compression of the scene brightness information has conventionally been effected on an analog basis by use of diode means having a logarithmic characteristic. This makes the circuit construction very simple, but at the same time involves serious deficiencies that the diode characteristic must be compensated for over the wide range of use of the diode and that there occurs a problem of thermal stability because of the temperature characteristic inherent to the diode element.

Further, for digitalization of an electronic shutter circuit, the analog-digital conversion circuit employed to digitalize the light quantity must have a diode provided in its initial stage for logarithmic compression of the analog quantity. This is because the scene brightness information varies over so wide a range, as pointed out above, that any direct digital conversion of such information may take excessive time, and hence the extended waiting time for shutter operation may result in missing the desired picture. On the other hand, the greatest advantage of digitalization is that it alleviates the exacting requirements for stability against variations in temperature and source voltage as well as for part characteristics. Such advantage of digitalization must be half lost in cases where diode means, which is required itself to meet strict conditions for thermal stability and operation characteristics, is used for logarithmic compression in the circuit for analog-digital conversion of the quantity of light measured.

SUMMARY OF THE INVENTION

In view of the above, the present invention has for its primary object the provision of a new and improved circuit for digitally processing exposure control information which does not make use of any diode means for logarithmic compression of the scene brightness information.

Another object of the present invention is to provide a circuit for digitally processing exposure control information in which the scene brightness information is directly transformed into a logarithmically compressed digital quantity.

In general, the photographic parameters including the aperture A, the film sensitivity S and the shutter speed T are indicated on the camera basically as an exponential function of which the base is an integer of 2. Thus, any information value X can be expressed in the form of $X = 2.^{XV}$. When finely divided, each parameter has an exponential spacing of $\frac{1}{3}$ for example and hence the exponent $X_V$ is expressed as $X_V = J/3$, where J represents an integer. Accordingly, the scene brightness information should also be expressed with the same base integer as that of the other parameters for its conversion into a logarithmically compressed digital quantity. Hence, the scene brightness information B and the corresponding logarithmically compressed information $B_V$ should be related to each other as $B = B_O \cdot 2^{BV}$, where $B_O$ represents a definite initial value of scene brightness information, and the exponential value $B_V$ can be expressed as follows:

$$B_V = J/3K = J_1 + J_2/3K \tag{2}$$

where K represents a positive integer, and $J_1$ and $J_2$ are both integers. It follows, therefore, that the scene brightness information can be digitally obtained as a logarithmically compressed information by determining $B_V$ of formula (2) in accordance with the scene brightness or luminance level of the subject to be photographed.

The data processing circuit of the present invention is designed to obtain the information of the above formula (2) and includes a two input comparison circuit; a gate circuit operable under control of the output of the comparison circuit to allow passage of a pulse signal of a predetermined frequency; an N-modulus counter circuit which generates a carry signal and is reset to zero every N-numbers of input pulses, and which counts output pulses from the gate circuit; an M-modulus counter circuit arranged to produce a control signal upon reception of each "carry" signal output from the N-modulus counter circuit; an L-modulus counter circuit arranged to produce a control signal upon reception of each "carry" signal output from the M-modulus counter circuit; a capacitor having a terminal voltage applied to one of the two inputs of the comparator; a constant-current circuit for charging the capacitor and having the value of the constant-current changed by the control signal from the M-modulus counter circuit; and a voltage producing circuit for generating a scene-brightness information voltage in response to the scene brightness and for applying the voltage to the other input of the comparator, the value of the voltage being changed by the control signal from the L-modulus counter circuit.

With this arrangement, each of the counter circuits takes count of input pulses fed thereto during the period of time running from the start of operation of the whole system up to the point of time when the terminal voltage of the capacitor exceeds the output voltage of the voltage producing circuit for generating the brightness-information-voltage. Moreover, the N-modulus counter circuit of the first stage is constructed so as to produce a carry signal each time the number of input pulses fed reaches 2×(3K); that is, the N-modulus counter circuit is formed as a counter circuit of 2×(3K)-modulus. The capacitor is discharged each time the counter circuit of the first stage produces a carry output while the constant-current circuit is controlled by a succession of such carry outputs so that its constant-current value is increased stepwise to $2^1, 2^2, 2^3, \ldots, 2^n$ times the initial value. On the other hand, the output voltage value of the voltage producing circuit is reduced under control of the carry output of the M-modulus counter circuit of the second stage to $\frac{1}{2}^1, \frac{1}{2}^2, \frac{1}{2}^3, \ldots, \frac{1}{2}^n$ times the initial value.

With the arrangement described, it is to be noted that, in the state of content of the N-modulus counter circuit held at a value of $(3K+J_2)$ after its carry signal has been repeated $J_1$ times, the information $J_1$ corresponds to an information quantity of $2^{J_1}$ and hence the information $(3K+J_2)$ corresponds to an information quantity of $2^{J_1}.(3K+J_2)$. For standardization, the quantity value $2^{J_1}.(3K+J_2)$ is divided by 3K and a quotient $2^{J_1}.(1+J_2/3K)$ is obtained, assuming that $0 \leq J_2 < 3K$. An approximation is obtained as $2^{J_2/3K} \approx 1 + J_2/3K$. Since this approximation is within the error range of 6%, the information quantity in the N-modulus counter circuit approximates to $2^{J_1} 2^{J_2/3K}$. Therefore, the contents of the counter circuit system represent an input information logarithmically compressed with a satisfactorily high accuracy of 6%, as clearly observed from formula (2).

It will now be appreciated that, according to the present invention, a logarithmically compressed digital quantity can be obtained without making use of any element having a logarithmic or exponential characteristic. Avoiding the use of such element not only eliminates the difficult problem of controlling its analog characteristics over any wide range or the problem of dealing with variations in the characteristics due to temperature change but also makes it possible to fully utilize the merits of digitalization of electronic camera exposure controls.

The above and other objects, features and advantages of the present invention will become apparent from the following detailed description when taken in conjunction with the accompanying drawings, which illustrate one preferred embodiment of the invention.

DESCRIPTION OF THE PREFERRED EMBODIMENT

Figure 1:
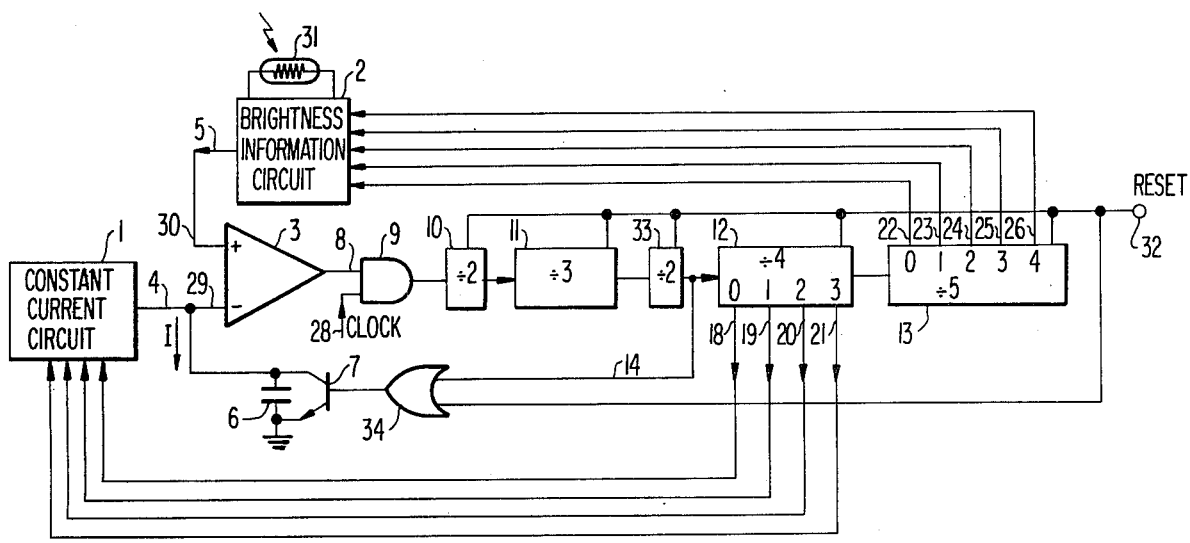
FIG. 1 is a circuit diagram of the preferred embodiment of the present invention.

Referring to FIG. 1, reference numeral 1 designates a constant-current circuit. A capacitor grounded at one terminal and connected at the other terminal with the constant-current circuit 1 is charged by the constant-current output 4. Accordingly, the terminal voltage of capacitor 6 is of sawtooth waveform, and such voltage is fed to one of the two inputs, i.e., the inverting input 29, of a comparator 3. The two terminals of capacitor 6 are connected to the collector and the emitter, respectively, of a transistor 7. Applied to the base of transistor 7 is an output signal of an OR circuit 34, which renders the transistor 7 conductive or nonconductive thereby to control the charging and discharging of the capacitor 6.

Reference numeral 2 designates a brightness-information-voltage producing circuit employing a cadmium-sulfide (CdS) light sensor 31. The voltage output 5 of this circuit 2 is fed to the noninverting input 30 of comparator 3, the output 8 of which is fed to one of the two inputs of an AND circuit 9. Fed to the other input of AND circuit 9 is a pulse signal 28 having a predetermined frequency.

The output pulses from the AND circuit 9 are fed through a binary counter 10, a ternary counter 11 and another binary counter 33 to a quaternary counter 12. The binary counters 10 and 33 and ternary counter 11 together form a $(2\times 3\times 2)$-modulus counter, which corresponds to the N-modulus counter, previously referred to, of K=2. The K value of 2 is conveniently taken here as it is considered generally satisfactory for cameras. The output of binary counter 33 is also fed to the OR gate 34 as one of its two inputs and the capacitor 6 is discharged each time the binary counter 33 produces a carry output.

The quarternary counter 12, corresponding to the M-modulus counter circuit previously referred to, produces an output signal successively at its output terminals 18, 19, 20 and 21 upon reception of a carry output from the preceding, binary counter 33. That is to say, the quarternary counter 12 produces a control signal at its terminal 18, 19, 20 or 21 in accordance with the content "0", "1", "2" or "3" of the counter 12. The control signal is fed to the constant-current circuit 1 to control its constant-current value.

Reference numeral 13 designates a quinary counter which operates upon reception of the carry output from the quarternary counter 12 and corresponds to the L-modulus counter circuit previously referred to. The quinary counter 13 produces an output signal upon reception of the carry output from the quarternary counter 12, successively at the output terminals 22, 23, 24, 25 and 26. That is to say, the quinary counter 13 produces a control signal at its output terminal 22, 23, 24, 25 or 26 in accordance with the content "0", "1", "2", "3" or "4" of the quinary counter and the control signal is fed to the voltage producing circuit 2 to control its output voltage.

Reference numeral 32 designates a reset signal input terminal of the system, which is connected with the respective reset terminals of the counter circuits 10, 11, 33, 12 and 13 and also with the other input terminal of OR gate 34.

Figure 2:
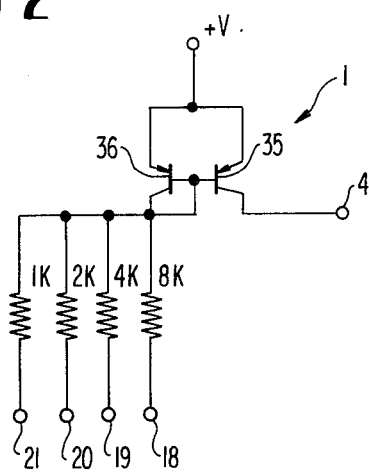
FIG. 2 is a detailed diagram showing one example of the constant-current circuit shown in FIG. 1.

One example of the constant current circuit 1 is shown in FIG. 2, in which reference numeral 4 designates the output terminal of the circuit, which is connected with the collector of a PNP transistor 35. The emitter of this transistor and that of another PNP transistor 36 are both connected to an appropriate power source. The base of transistor 35 and the base and the collector of transistor 36 are connected with each other and with resistors $R_1, R_2, R_3$ and $R_4$, which are connected at the other ends to the respective output terminals 18, 19, 20 and 21 of quarternary counter 12 and have respective resistance values, for example, of 8 KΩ, 4 KΩ, 2 KΩ and 1 KΩ. With this arrangement, the constant-current values $I_0, I_1, I_2$ and $I_3$, respectively corresponding to the contents of the quarternary counter 12 of "0", "1", "2" and "3" have the following relations therebetween:

$$I_1 = 2I_0, I_2 = 4I_0 \text{ and } I_3 = 8I_0$$

or, in generalized form, $$I_m = 2^m I_0 (m = 0, 1, 2, 3) \qquad (3)$$

Figure 3:
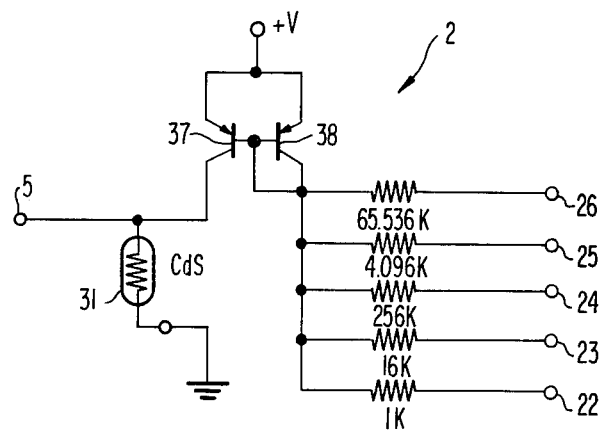
FIG. 3 illustrates one example of the voltage producing circuit for producing the brightness signal voltage of FIG. 1.

In FIG. 3, which illustrates one example of voltage producing circuit 2 shown in FIG. 1, resistors, $R_5$, $R_6$, $R_7$, $R_8$ and $R_9$ are connected at one end to the respective output terminals 22, 23, 24, 25 and 26 of quinary counter 13 and connected at the other end with a common junction which is connected with the base of a PNP transistor 37 and with the base and the collector of another PNP transistor 38. The emitters of the two transistors 37 and 38 are both connected to a power source. The collector of transistor 37 serves as the output terminal 5 of the voltage producing circuit 2 and is grounded by way of the CdS light sensor element 31. The resistors $R_5$, $R_6$, $R_7$, $R_8$ and $R_9$ have respective resistance values selected at 1 K$\Omega$, 16 K$\Omega$, 256 K$\Omega$, 4,096 K$\Omega$ and 65,536 K$\Omega$, respectively. With this arrangement, the values of current ICdS0, $I_{CdS1}$, $I_{CdS2}$, $I_{CdS3}$ and $I_{CdS4}$, which are fed to the CdS light sensor 31 when the content of quinary counter 13 is "0", "1", "2", "3" or "4", respectively, are related as follows:

$$I_{CdS1} = I_{CdS0}/2^4$$

$$I_{CdS2} = I_{CdS0}/2^8$$

$$I_{CdS3} = I_{CdS0}/2^{12}$$

and $$I_{CdS4} = I_{CdS0}/2^{16}$$

or, in generalized form, $$I_{CdSl} = I_{CdS0}/2^{4l} \; (l = 0, 1, 2, 3, 4) \qquad (4)$$

Accordingly, the output voltage of the voltage producing circuit 2 is expressed as $$V_{CdSl} = R_{CdS} \cdot I_{CdSl} \qquad (5)$$

Description will next be made of the operation of the circuit system shown in FIG. 1.

When the voltage charged in capacitor 6 exceeds or becomes higher than the terminal voltage 5 of voltage producing circuit 2, the output of the comparator 3 is reversed to close the AND gate 9 and block passage of any pulse signal therethrough. This means that, while the voltage charged in the capacitor 6 is lower than the input voltage 30 to the comparator 3, the AND gate 9 is held open to allow pulse signals to be fed to the counter circuit system.

Now suppose that the reset signal 32 is generated and light metering is started. By way of example, it is assumed that the output 8 of the comparator 3 is reversed when the quarternary counter 12 is in the state of content m and the first and second counters 10 and 11 are in the state of content $J_2$. If, at this point, the content of quinary counter 13 is "0", the number of input pulses already fed to the counter system is $(6+J_2)+6m$, m representing the content of counter 12, and the value of a constant-current output of the constant-current circuit 1 is expressed by formula (3). It will be understood at this point that each time the binary counter 33 produces a carry signal, the capacitor 6 is discharged to 0V through the transistor 7 and then freshly charged with the output current of the constant current circuit 1, which is expressed by formula (3). As the content of quarternary counter 12 is m and the content of first, second and third counters 10, 11 and 33 is $(6+J_2)$, it is found that $$V_{CdS0} = (T_0 \cdot I_m/C) \cdot (6+J_2) \qquad (6)$$

where $T_0$ represents the period of the pulse signal. Substituting formula (3) into formula (6), $$6 + J_2 = (C \cdot V_{CdS0})/(2^m T_0 \cdot I_0) \qquad (7)$$

is obtained. It will be clearly noted from formula (7) that the content $(6+J_2)$ of the counters 10, 11 and 33 is weighted by $2^m$ in accordance with the content m of the quarternary counter 12 as compared with the number of pulses $(C \cdot V_{CdS0})/(T_0 \cdot I_0)$ which would have been counted if the constant-current value of the constant current circuit 1 were not changed with the carry signal from counter 33.

Next, it is assumed that the output 8 of comparator 3 is reversed when the content of counter 13 is l, the content of counter 12 is m and the content of counters 10 and 11 is $J_2$. In this case, the total number of input pulses counted by the counter system is $(6+J_2)+6m+(6\times 4)l$ and it is found from formulas (4) and (5) that the output voltage $V_{CdSl}$ of the voltage producing circuit 2 is expressed as $$V_{CdSl} = V_{CdS0}/2^{4l} \qquad (8)$$

On the other hand, the charge voltage of capacitor 6 has a value expressed by formula (6) and the voltage, $V_{CdS}$, is equal to the voltage of formula (8). Therefore, the following relation holds:

$$6 + J_2 = (C \cdot V_{CdS0})/(2^m \cdot 2^{4l} \cdot T_0 \cdot I_0) \qquad (9)$$

It is seen from this relation (9) that the content $(6+J_2)$ of the counters 10, 11 and 33 is weighed by $2^m \cdot 2^{4l}$ in accordance with the contents m and l of counters 12 and 13 as compared with the number of pulses that would have been counted if the constant-current value of the constant-current circuit 1 and the voltage value of the voltage producing circuit 2 were not changed by the carry signal from the counter 33.

To normalize the equation (9), both sides are divided by 6 and modified as follows:

$$(C \cdot V_{CdS0})/(6 \cdot T_0 \cdot I_0) = 2^m \cdot 2^{4l} \cdot (1 + J_2/6) \qquad (10)$$
$$= 2^{(m+4l)} \cdot 2^{J_2/6}$$

The left side of this equation (10) represents the information inversely proportional to the scene brightness information B, that is, the information 1/B, and it is noted that the counter contents $J_2$, m and l represent the values of the exponent of logarithmic compression of the information 1/B since in the above formula (2) of the exponential value $B_V$ of the brightness information B, $(-J_1)$ corresponds to $(m+4l)$ and $(-J_2)$ to the $J_2$ in equation (10).

Incidentally, in the illustrated embodiment, the largest value of the information 1/B is $2^{(3+4\times 4)} \times 2^{5/6}$, giving about $10^6$, which is enough for practical applications. Obviouly, any greater value may be realized with ease by increasing the number of counter stages used.

Further, in the illustrated embodiment, the maximum count of pulses is $4 \cdot 4 \cdot 2 \cdot 3 \cdot 2 + 3 \cdot 2 \cdot 3 \cdot 2 + 1 \cdot 3 \cdot 2 + 2 \cdot 2 + 1 = 239$, and this makes it possible to complete the light metering in a very limited length of time. For instance, where a clock signal of 20 KHz is used for pulse counting, the light metering can be completed within about 12 msec., a rapidity satisfactory for practical use.

Figure 4:
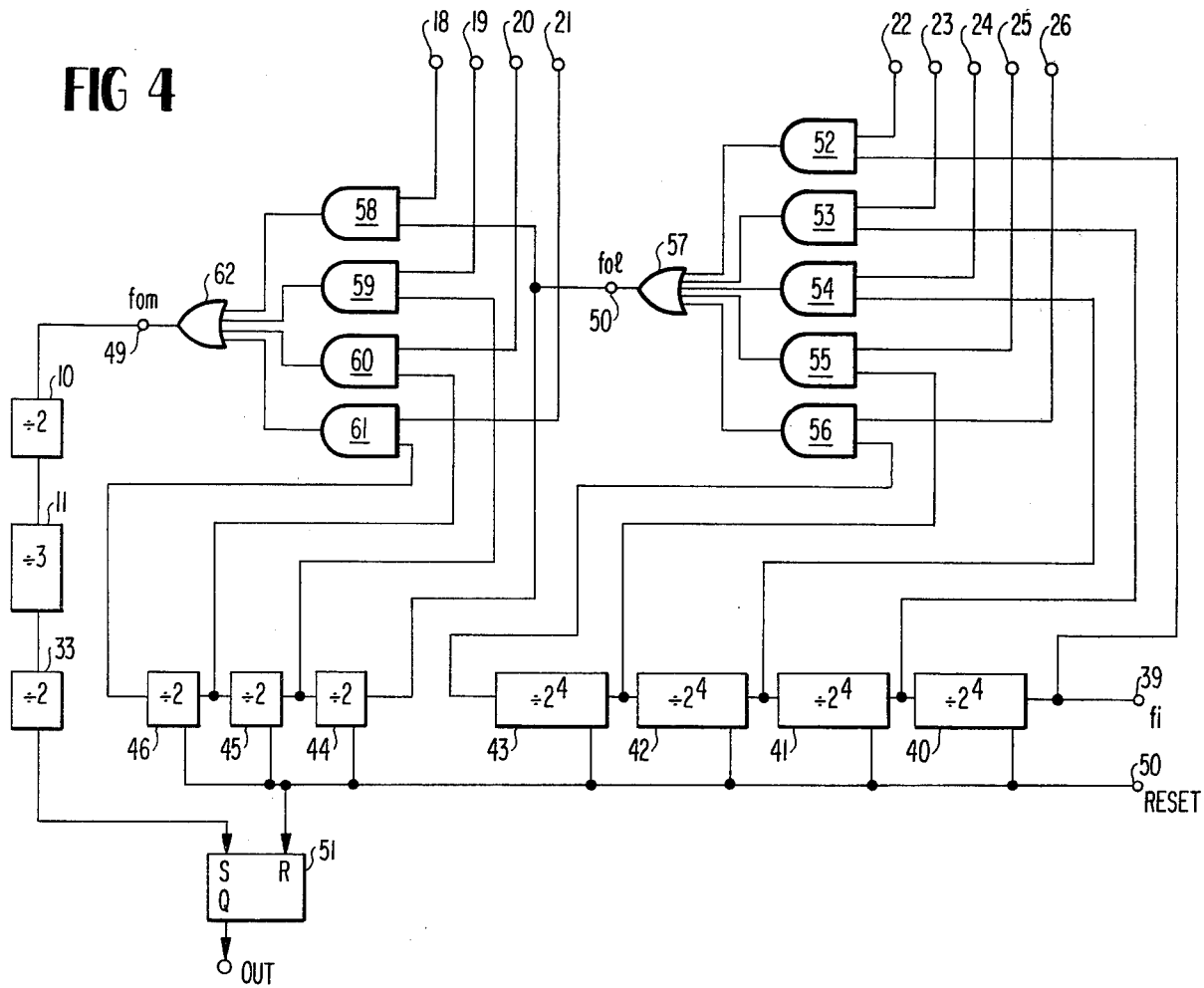
FIG. 4 is a diagram illustrating one example of the digital logarithmic-expansion circuit for obtaining an exposure control signal.

Illustrated in FIG. 4 is a form of logarithmic expansion circuit operable to define an exposure time upon the recipocal 1/B of the brightness information B as logarithmically compressed in the circuit of FIG. 1. Reference numeral 39 designates an input terminal to which a signal of reference frequency $f_i$ is applied to be fed into a series connection of a number (four) of $\frac{1}{2}^4$ frequency dividers 40, 41, 42 and 43. AND circuits 52, 53, 54, 55 and 56 are each connected at one of its input terminals with the respective one of the output terminals 22 to 26 of quinary counter 13. One of the AND circuits, 52, is fed at the other input with the signal $f_i$ while the remaining AND circuits 53 to 56 are each connected at the other input with the output of the respective one of the frequency dividers 40 to 43. The outputs of AND circuits 52 to 56 are connected with the respective inputs of an OR circuit 57. With this arrangement, the outputs of the frequency dividers 40 to 43 are selected by the respective gate circuits in accordance with the content l of the quinary counter 13 to produce an output $f_{ol}$ at the output terminal 50 of OR gate 57.

The output terminal 50 of OR gate 57 is connected with the input end of a series connection of three $\frac{1}{2}$ frequency dividers 44, 45 and 46. AND circuits 58, 59, 60 and 61 are connected at one input thereof with the outputs 18 to 21 of the quarternary counter 12. One of the AND circuits, 58, is fed at the other input with the signal $f_{ol}$ from the output 50 of OR gate 57 while the remaining AND circuits 59, 60 and 61 are fed at the other input with the respective outputs of $\frac{1}{2}$ frequency dividers 44 to 46. The outputs of these AND circuits 58 to 61 are fed to an OR gate 62. As will be readily noted, the outputs of $\frac{1}{2}$ frequency dividers 44 to 46 are selected by the respective associated AND gates 58 to 61 in accordance with the content m of the quarternary counter 12 to produce a signal $f_{om}$ at the output end 49 of the OR gate 62.

The output signal $f_{om}$ is introduced into the series connection of the binary counter 10, the ternary counter 11 and the binary counter 33, which are shown in FIG. 1, and the output of the counter system is fed to the S input of an R-S flipflop 51. As will be understood, the output Q of the R-S flipflop 51 represents a desired exposure-time control signal. A reset signal is introduced into the system illustrated at a terminal 63 which is connected to the respective reset inputs of the counter and flipflop circuits.

Now assume that the contents of the counters (10, 11, 33), 12 and 13 are $(6+J_2)$, m and l, respectively, and that the signal of the reference frequency $f_i$ is applied to the terminal 39 and the reset signal released. First, as the content of counter 13 is l, the signal applied appears at one of the counter terminals 22 to 26 and the associated one of the AND circuits 52 to 56 is enabled. Thus, the period of output signal $f_{ol}$ of the OR circuit 57 is expressed as $$1/f_{ol} = (1/f_i) \cdot 2^{4l}$$

Similarly, the period of the output signal $f_{om}$ of the OR circuit 62 is expressed, for the content m of the quarternary counter 12, as follows:

$$1/f_{om} = (1/f_{ol}) \cdot 2^m = (1/f_i) \cdot 2^m \cdot 2^{4l}$$

The signal $f_{om}$ is led to the series connection of counters 10, 11 and 33 to cause them to count down its content $(6+J_2)$. The time T required to count down to zero is expressed as $$T = (1/f_{om}) \cdot (6 + J_2) = (1/f_i) \cdot (6 + J_2) \cdot 2^m \cdot 2^{4l} \quad (11)$$
$$\approx (6/f_i) \cdot 2^m \cdot 2^{4l} \cdot 2^{J_2/6}$$

Now, it suffices for shutter operation to set the flipflop 51 at the end of time T. In this manner, the shutter speed T, that is, a time during which the shutter is opened, is obtainable as a logarithmic expansion of the counter content obtained in the system of FIG. 1, which is a logarithmically compressed form of the reciprocal 1/B of scene brightness information B.

In this connection, it is to be noted that the formula (11) is applicable to aperture preferred camera exposure systems if $f_i$ in formula (11), i.e., the frequency of the reference signal used in the circuit of FIG. 4 is determined, is a function of digital quantities such as film sensitivity information S and aperture information A.

The shutter speed T may also be obtained by a slightly different manner, in which the contents of the counter system in FIG. 1 representing the reciprocal brightness information 1/B logarithmically compressed is added or subtracted by the film sensitivity information and the aperture information logarithmically compressed. In other words, the counter system counter system including the counter 10, 11, 33, 12 and 13 in FIG. 1 is supplied with the pulses representing the aperture information A to count up its content with each pulse. Moreover, the counter system is supplied with the pulses representing the film sensitivity information S to count down its content with each pulse. Therefore, the content of the counter system holds the information representing the logarithmically compressed information of the shutter speed T shown in the equation (11). Accordingly, as described above, the shutter speed T logarithmically expanded is obtained by utilizing the circuit in FIG. 4. In this case, the frequency $f_i$ of the reference input 39 is a predetermined constant frequency.

With respect to the aperture control in a camera of a shutter-preferred type, the aperture is, generally, controlled by an aperture motor for reducing the aperture area. Therefore, there is provided a circuit for generating pulses having the logarithmically compressed number inversely proportional to the aperture area, and when the number of pulses comes to be equal with the contents of the counter system in the circuit of FIG. 1, the aperture control motor is brought to reset to fix the aperture setting. In this case, the counter system, of course, holds the logarithmically compressed information, inversely proportional to the aperture area, obtained by counting-down the pulses representing the logarithmically compressed film-sensitivity information and the logarithmically compressed shutter-speed information.

In general, when the N-modulus counter is used as the counters 10, 11 and 33 and the M and L-modulus counters are used as the counters 12 and 13, respectively, the control terminals of the M and L-modulus counters are M and L in number, respectively. Therefore, in the constant current circuit 1 of FIG. 2 there are provided M-number of resistors each having one terminal connected to the M-number of the control terminals of the M-modulus counter, respectively. The respective resistance values are determined such that the constant current values $I_0, I_1, I_2, \ldots I_M$ respectively corresponding to the contents of the M-modulus counter of "0", "1", "2", ... "M−1" have the following relations therebetween:

$$I_m = 2^m \cdot I_0 \ (m = 0, 1, 2, \ldots, M-1)$$

Moreover, in the voltage producing circuit 2 of FIG. 3 there are provided L-number of resistors each having one terminal connected to the L-number of the control terminals of the L-modulus counter, respectively. The respective resistance values are determined such that the current values $V_{CdS0}, V_{CdS1}, V_{CdS2}, \ldots V_{CdSL-1}$ fed to the CdS light sensor 31 respectively corresponding to the contents of the L-modulus counter of "0", "1", "2", ... "L−1" have the following relations therebetween:

$$I_{CdSl} = I_{CdS0}/2^{M \cdot l} \ (l = 0, 1, 2, \ldots, L-1)$$

In the circuit of FIG. 4, the (L−1)-number of the dividers each having a dividing ratio $\frac{1}{2}^M$ are used in series connection. The L number of the AND gates are provided and controlled by the L-number of the control signals of the L-modulus counter, respectively. Therefore, the $\frac{1}{2}^M$ dividers are selected by the respective AND gates in accordance with the content l of the L-modulus counter to produce the output $f_{0l}$ at the output 50 of the OR gate 57. Moreover, the (M−1)-number of the dividers each having a dividing ratio $\frac{1}{2}$ are used in series connection. The M-number of the AND gates are provided and controlled by the M-number of the control signals of the M-modulus counter, respectively. Therefore, the $\frac{1}{2}$ dividers are selected by the respective AND gates in accordance with the content M of the M-modulus counter to produce the output $f_{0m}$ at the output 49 of the OR gate 62.

In this case, the formula (11) representing the shutter speed T is reformed as follows:

$$T = (1/f_i) \cdot (6 + J_2) \cdot 2^m \cdot 2^{Ml} \quad (12)$$
$$= (6/f_i) \cdot 2^m \cdot 2^{Ml} \cdot 2^{J_2/6}$$

According to the present invention, the circuit for converting the scene brightness information, varying over a very wide range into a digital quantity by logarithmic compression is so constructed that the amplitude of the input analog quantity is obtained as a direct digital logarithmic compression of the read-in information without any element having a logarithmic or exponential characteristic. This makes it possible to realize a logarithmic-compression analog-digital conversion circuit highly excellent in stability against temperature and voltage variations.

Though in the embodiment illustrated a CdS light sensor is employed as a light metering element, it will be apparent that any other form of light metering element, for example, a photocell can also be employed with quite the same results. In this case, as the output current from the photocell is very limited, the output voltage, directed through the current amplifier and appearing, for example, at a load resistance, can be fed to the input terminal 30 in FIG. 1.

What is claimed is:

1. A circuit arrangement for digitally processing an exposure control information comprising:
   a comparison circuit having two input terminals;
   a gate circuit controlled by the output of said comparison circuit to allow passage of a pulse signal of a predetermined frequency;
   an N-modulus counter counting output pulses from said gate circuit;
   an M-modulus counter counting carry output signals of said N-modulus counter and generating a control signal upon reception of each said carry output signal;
   an L-modulus counter counting carry output signals of said M-modulus counter and generating a control signal upon reception of each said carry signal of said M-modulus counter;
   a capacitor having one terminal connected to one of said two inputs of said comparison circuit;
   a constant-current circuit for charging said capacitor and having the current value thereof changed by said control signal of said M-modulus counter; and
   a voltage circuit for generating a scene-brightness information voltage in response to the scene-brightness to supply the other input of said comparison circuit with said information voltage, the value of said voltage being in direct proportion to the scene brightness and being changed by said control signal of said L-modulus counter.

2. The circuit arrangement of claim 1, further comprising:
   a first group of the (L−1)-number of frequency dividers each having a dividing ratio $\frac{1}{2}^M$, said first group of the dividers being serially connected to divide a predetermined frequency of an input signal;
   first means for selecting one of the output signals of said first group of the dividers in response to said control signal of said L-modulus counter;
   a second group of the (M−1)-number of frequency dividers each having a dividing ratio $\frac{1}{2}$, and second group of the dividers being serially connected to divide a frequency of the output signal selected by said first selecting means; and
   second means for selecting one of the output signals of said second group of the dividers in response to said control signal of said M-modulus counter;
   wherein said N-modulus counter counts-down from a content thereof each said output signal selected by said second selecting means to zero.

3. The circuit arrangement of claim 2, further comprising:
   a flipflop set by the output of said N-modulus counter when the content thereof is counted down to zero, said flipflop, said (L−1)-number of frequency dividers and said (M−1)-number of frequency dividers being initially reset when light metering is started, the output of said flip-flop providing an indication of proper exposure time. of frequency dividers and said (M−1)-number of frequency dividers being initially reset when light metering is started, the output of said flip-flop providing an indication of proper exposure time.

4. The circuit arrangement of claim 3, further comprising:

a source of constant frequency pulses connected to said gate circuit; and a source of said input signal to said (L−1)-number of frequency dividers, said input signal having a predetermined frequency which is a function of film sensitivity information and aperture information.

5. The circuit arrangement of claim 1, wherein said constant-current circuit comprises:

first and second transistors each having base, collector and emitter, the emitters of said first and second transistors being connected to a source of voltage and the bases of said first and second transistors being connected in common with the collector of said first transistor; and M resistors each connected at one end in common with the collector of said first transistor and connected at the other end to a respective output of said M-modulus counter, the resistance values of said M resistors being weighted with respect to each other so that the output of said constant-current circuit is as follows:

$$I_m = 2^m I_0 (m = 0, 1, \ldots, (M-1)),$$

where $I_0$ is the minimum current output, said constant-current circuit output being taken from the collector of said second transistor.

6. The circuit arrangement of claim 5, wherein said voltage circuit comprises:

third and fourth transistors each having base, collector and emitter, the emitters of said third and fourth transistors being connected to a source of voltage and the bases of said third and fourth transistors being connected in common with the collector of said third transistor;

L resistors each connected at one end in common with the collector of said third transistor and connected at the other end to a respective output of said L-modulus counter, the resistance values of said L resistors being weighted with respect to each other so that the output current from the collector of said fourth transistor is as follows:

$$I_l = I_0 / 2^{4l} (=0, 1, \ldots, (L-1)),$$

where $I_0$ is the minimum current output; and a light-responsive element connected between the collector of said fourth transistor and a source of reference voltage, said light-responsive element having a resistance which varies as a function of scene-brightness, the output of said voltage circuit being taken across said light-responsive element.

7. The circuit arrangement of claim 6, wherein said light-responsive element is a CdS light-sensor element.

8. The circuit arrangement of claim 1, wherein said M-modulus counter is a quaternary counter and said L-modulus counter is a quinary counter.

9. The circuit arrangement of claim 8, wherein said N-modulus counter comprises the series connection of a first binary counter, a ternary counter and a second binary counter.

* * * * *

UNITED STATES PATENT AND TRADEMARK OFFICE
CERTIFICATE OF CORRECTION

PATENT NO. : 4,184,151

DATED : January 15, 1980

INVENTOR(S) : Shigehisa IWATA

It is certified that error appears in the above—identified patent and that said Letters Patent are hereby corrected as shown below:

Column 1, line 24, after "over" insert --a--

Column 3, line 19, delete "$2^{J_1} \cdot (3K + J_2)$" insert --$2^{J_1} \cdot (3K + J_2)$--

Column 3, line 20, delete "$2^{J_1} \cdot (3K + J_2)$" insert --$2^{J_1} \cdot (3K + J_2)$--

Column 3, line 21, delete "$2^{J_1} \cdot (1+J_2/3K)$" insert --$2^{J_1} \cdot (1+J_2/3K$--

Column 3, line 25, delete "$2^{J_1} \, 2^{J_2}/3K$" insert --$2^{J_1} \cdot 2^{J_2}/3K$--

Column 6, line 66, after "X" should read --$2^{5/6}$--

Column 7, line 31, correct the printing type

Column 8, line 35, delete "counter system" (first occurrence)

UNITED STATES PATENT AND TRADEMARK OFFICE
CERTIFICATE OF CORRECTION

PATENT NO. : 4,184,151
DATED : January 15, 1980
INVENTOR(S) : Shigehisa IWATA

It is certified that error appears in the above-identified patent and that said Letters Patent are hereby corrected as shown below:

Column 8, line 36, delete "counter" insert --counters--

Column 10, line 44, delete "and" insert --said--

Column 10, lines 62-66, delete "of frequency...exposure time" (second occurrence)

Column 12, line 13, after "(" insert --ℓ--

Signed and Sealed this

Tenth Day of June 1980

[SEAL]

Attest:

SIDNEY A. DIAMOND
Commissioner of Patents and Trademarks

Attesting Officer